Nov. 19, 1929.   T. J. MADIGAN   1,736,542
EGG BEATER
Filed March 8, 1928

INVENTOR
Thomas J. Madigan
BY
ATTORNEY

Patented Nov. 19, 1929

1,736,542

UNITED STATES PATENT OFFICE

THOMAS J. MADIGAN, OF BROOKLYN, NEW YORK

EGG BEATER

Application filed March 8, 1928. Serial No. 259,969.

This invention relates to agitating devices such as used for beating eggs, whipping cream, and performing similar operations.

Heretofore, agitating devices employed for the purposes indicated above, required the use of both hands of the operator and when it was necessary to add certain ingredients to the substance being agitated, the operation had to be stopped to permit the use of one of the hands of the operator. Also, such devices are operated by a mechanism which is only effective while pressure is applied; and the direction of rotary movement of the agitator blades is continuously in one direction.

It is an object of this invention to provide an agitating device which may be manipulated with one hand.

A further object is to provide an agitating device for beating eggs, whipping cream, or like purposes, which is equipped with a mechanism that permits continuous to and fro movement of the blades of the device.

A still further object is to provide an egg beating, or cream whipping device which may be cheaply made and at the same time operate more easily and efficiently than heretofore has been the case with similar devices.

These and other objects are attained by the novel construction, combination and arrangement of parts, hereinafter described and shown in the accompanying drawing, constituting a material part of this disclosure, and in which:—

Figure 1:
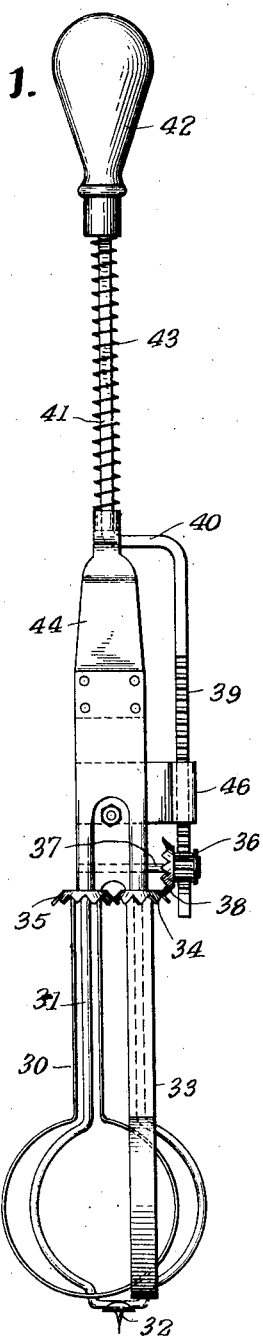
Figure 1 is a front view of the preferred form of the device.
Figure 2:
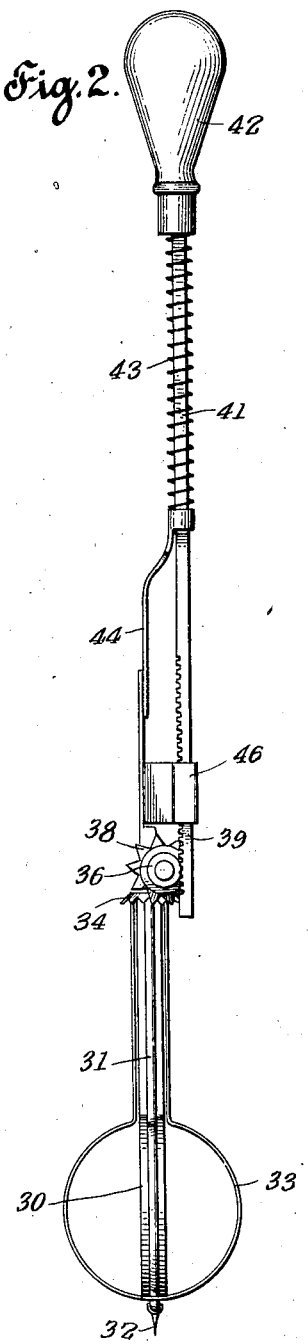
Figure 2 is a side view of the device shown in Figure 1.

In the preferred form shown in Figures 1 and 2, only one blade unit 30 is used. This unit is mounted upon an appropriately bent wire rod 31 which is provided with a pointed spur 32 and has one leg embraced by the support 33 upon which rests a sheet metal gear 34 having a central aperture to allow the wire rod 31 to pass freely therethrough.

The gear 34 engages a similar gear 35, horizontally positioned at the upper end of and integral with blade unit 30 and also engages a vertical gear 38 which is non-rotatably mounted on shaft 37, upon which the pinion 36 is in mesh with a rack 39 which forms the extremity of a rod 41 having a bent portion 40 to offset the rack from the mid-portion of the device.

A handle 42 is mounted on the upper end of the rod 41, the latter being surrounded by a compression spring 43 which abuts a shoulder on the handle 42 and the collar 45 on supporting bracket 44, the latter also carrying an extension 46 which serves as a guide for the rack 39.

In operation, only one hand need be used to operate the device, pressure being applied to the handle 23 and transmitted through the rack and pinion to the gears to produce rotary movement of the blade units in one direction. When the pressure is relieved, the compression spring 22 moves the rack upward to cause rotary movement of the blade units in the opposite direction. It will therefore be seen that there is a continual to and fro rotation of the blade units.

The foregoing disclosures are to be regarded as descriptive and illustrative only, and not as restrictive or limitative of the invention, of which obviously an embodiment may be constructed including many modifications without departing from the general scope herein indicated and denoted in the appended claim.

Having thus described the invention, what is claimed as new and desired to secure by Letters Patent, is:—

In an egg beater, a sheet metal support, agitating units mounted on the support, gear means for actuating said units, a shaft journalled in said support, a pinion mounted on one end of the shaft, a rod slidably mounted in the support and having an offset portion, said offset portion being formed into a rack engaging the pinion, said support having a projection formed to serve as a guide for the rack, and spring means to normally urge the rod in one direction.

In testimony whereof I have hereunto affixed my signature at New York city, State of New York, this 6th day of March, 1928.

THOMAS J. MADIGAN.